(12) United States Patent
Brown et al.

(10) Patent No.: US 9,917,922 B2
(45) Date of Patent: Mar. 13, 2018

(54) EXTENSIBILITY BUNDLES FOR A CLOUD AND DEVICES SUITE

(71) Applicant: MICROSOFT TECHNOLOGY LICENSING, LLC, Redmond, WA (US)

(72) Inventors: Dorrene Brown, Redmond, WA (US); Dmitry Pugachev, Redmond, WA (US); Humberto Lezama Guadarrama, Redmond, WA (US); Shreedhar Thirugnanasambantham, Redmond, WA (US); Xiao Wu, Redmond, WA (US); Jay Rathi, Kirkland, WA (US); Mauricio Ordonez, Bellevue, WA (US); Rolando Jimenez Salgado, Sammamish, WA (US); Yi Li, Redmond, WA (US); Gabriel Hall, Seattle, WA (US); Robert Ward, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 115 days.

(21) Appl. No.: 14/863,971

(22) Filed: Sep. 24, 2015

(65) Prior Publication Data
US 2016/0313990 A1 Oct. 27, 2016

Related U.S. Application Data

(60) Provisional application No. 62/153,401, filed on Apr. 27, 2015.

(51) Int. Cl.
| | | |
|---|---|---|
| *G06F 9/44* | (2006.01) | |
| *H04L 29/08* | (2006.01) | |
| *G06F 9/445* | (2018.01) | |

(52) U.S. Cl.
CPC ............... *H04L 67/34* (2013.01); *G06F 8/61* (2013.01); *G06F 9/44526* (2013.01)

(58) Field of Classification Search
CPC ......... H04L 67/34; G06F 8/61; G06F 9/44526
(Continued)

(56) References Cited

U.S. PATENT DOCUMENTS 8,220,007 B1 *  7/2012  Yeh ........................... G06F 8/65
                                                    719/328
8,694,988 B2 *  4/2014  Goldman ............ G06F 9/44526
                                                    717/162

(Continued)

OTHER PUBLICATIONS

Apple, "App Extension Programming Guide", Mar. 9, 2015, Apple Inc.*

(Continued)

*Primary Examiner* — Wei Zhen
*Assistant Examiner* — Hossain Morshed
(74) *Attorney, Agent, or Firm* — Turk IP Law, LLC

(57) ABSTRACT

An interface mechanism is provided for developers to bundle together a set of extensions (or add-ins) to a productivity suite allowing end users and system administrators to manage their lifecycle in a unified way. Aspects such as discovery, acquisition, authorization deployment, management, updates, and similar ones may be addressed for the bundle as opposed to each of the different extensions (for example extensions for different versions of the same application such as desktop version, web application version, mobile version, etc.). Bundles may also provide a means to match specific functional sets or commercial offerings to specific user or customer profiles.

19 Claims, 9 Drawing Sheets

(58) Field of Classification Search
USPC .................................................. 717/120, 121
See application file for complete search history.

(56) References Cited

U.S. PATENT DOCUMENTS

| | | | | |
|---|---|---|---|---|
| 8,788,631 | B2* | 7/2014 | Abeln | G06F 9/44526 |
| | | | | 709/220 |
| 2007/0283344 | A1* | 12/2007 | Apte | G06F 8/61 |
| | | | | 717/174 |
| 2008/0109801 | A1 | 5/2008 | Levine et al. | |
| 2012/0331460 | A1 | 12/2012 | Manahan et al. | |
| 2014/0075301 | A1* | 3/2014 | Mihara | G06F 17/24 |
| | | | | 715/255 |

OTHER PUBLICATIONS

Apple, "App Extension Programming Guide", Mar. 9, 2015, Apple Developer.*
Guha, "Verified Security for Browser Extensions", 2011, IEEE Symposium on Security and Privacy.*
"Add Extensions—Esri Maps for SharePoint", Retrieved on: Apr. 16, 2015, Available at: http://doc.arcgis.com/en/maps-for-sharepoint/beta/esri-maps-web-part/add-extensions.htm.
"Productivity Power Tools for Visual Studio 2013", Retrieved on: Apr. 16, 2015, Available at: https://chocolatey.org/packages/VS2013.PowerTools.
"OpenOffice", Published on: May 26, 2012, Available at: http://www.openoffice.org/uof/.
Cohen, Zviki, "Installing Multiple Eclipse Plugins with Ease", Published on: May 17, 2010, Available at: http://eclipse.dzone.com/articles/installing-multiple-eclipse.
Logghe, Damian, "Install Multiple WordPress Plugins in Just a Few Clicks", Published on: Jun. 5, 2014, Available at: http://code.tutsplus.com/articles/install-multiple-wordpress-plugins-in-just-a-few-clicks--cms-21311.
"Add-ons for Firefox", Published on: May 1, 2012, Available at: https://addons.mozilla.org/en-us/faq.
"Microsoft Office Compatibility Pack for Word, Excel, and PowerPoint File Formats", Published on: Jun. 1, 2010, Available at: http://www.microsoft.com/en-in/download/details.aspx?id=3.
"Installation-Guide—OpenOffice", Published on: Dec. 24, 2012, Available at: https://wiki.openoffice.org/w/images/7/7e/Installation_Guide_OOo3.pdf.
"SAP Lumira _ SCN", Retrieved on: Apr. 15, 2015, Available at: http://scn.sap.com/community/lumira/blog.
"xdocdiff WinMerge Plugin", Published on: Nov. 5, 2011, Available at: http://freemind.s57.xrea.com/xdocdiffPlugin/en/.
"App Extension Programming Guide", Published on: Mar. 9, 2015, Available at: https://developer.apple.com/library/ios/documentation/General/Conceptual/ExtensibilityPG/ExtensibilityPG.pdf.
"Novell Vibe Add-In 1.0.1", Published on: Mar. 7, 2013, Available at: https://www.novell.com/documentation/vibe33/vibe33_qs_office/data/vibe33_qs_office.html.
Meligy, "Visual Studio 2010, 2012, and 2013 Extension Manager", Published on: Aug. 10, 2010, Available at: http://gurustop.net/blog/2010/08/10/visual-studio-2010-extension-manager-online-gallery-behind-internet-proxy/.
"International Preliminary Report on Patentability Issued in PCT Application No. PCT/US2016/029273", dated Jan. 25, 2017, 7 Pages.
"International Search Report and Written Opinion Issued in PCT Application No. PCT/US2016/029273", dated Jul. 1, 2016, 13 Pages.
Guha, et al., "Verified Security for Browser Extensions", In Proceedings of the IEEE Symposium on Security and Privacy, May 22, 2011, pp. 115-130.
O'Brien, Duane , "Create Your Own Browser Extensions, Part 1: Extend your reach into chrome write a basic browser extension for chrome", Retrieved from <<http://web.archive.org/web/20160622072400/http://www.ibm.com/developerworks/library/os-extendchrome/os-extendchrome-pdf.pdf>>, Apr. 5, 2013, 16 Pages.
"Second Written Opinion Issued in PCT Application No. PCT/US2016/029273", dated Oct. 10, 2016, 6 Pages.

* cited by examiner

EXTENSIBILITY BUNDLES FOR A CLOUD AND DEVICES SUITE

CROSS-REFERENCE TO RELATED APPLICATIONS

This Application claims the benefit under 35 U.S.C. § 119(e) of U.S. Provisional Patent Application Ser. No. 62/153,401 filed on Apr. 27, 2015. The disclosure of the U.S. Provisional Patent Application is hereby incorporated by reference in its entirety.

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as handheld computers, smart phones, tablet devices, and comparable devices hake become common. Such devices execute a wide variety of applications ranging from communication applications to productivity applications. Many such applications allow execution of third party application or service features through extensions or add-ins. Some add-ins may be automated, that is, an app may be consented to that automatically runs some script in the background regardless of user input.

Due to the variety of devices and platforms, different versions of the same application may be implemented in different ways, thus making it potentially cumbersome to install and manage extensions or add-ins.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to extensibility bundles for web and other applications. According to some examples, an interface such as an application programming interface (API) may be provided to add an extension module to one or more applications, for example, within a productivity suite. The extension module may be defined through a type, a behavior, a property, an activation parameter, and/or a lifecycle event. Addition of the extension module to the one or more applications and to one or more versions of the one or more applications may be enabled based on the definition, where the versions may include a web application, a desktop application, or a mobile application. The extension module may then be integrated to the one or more applications or the one or more versions.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
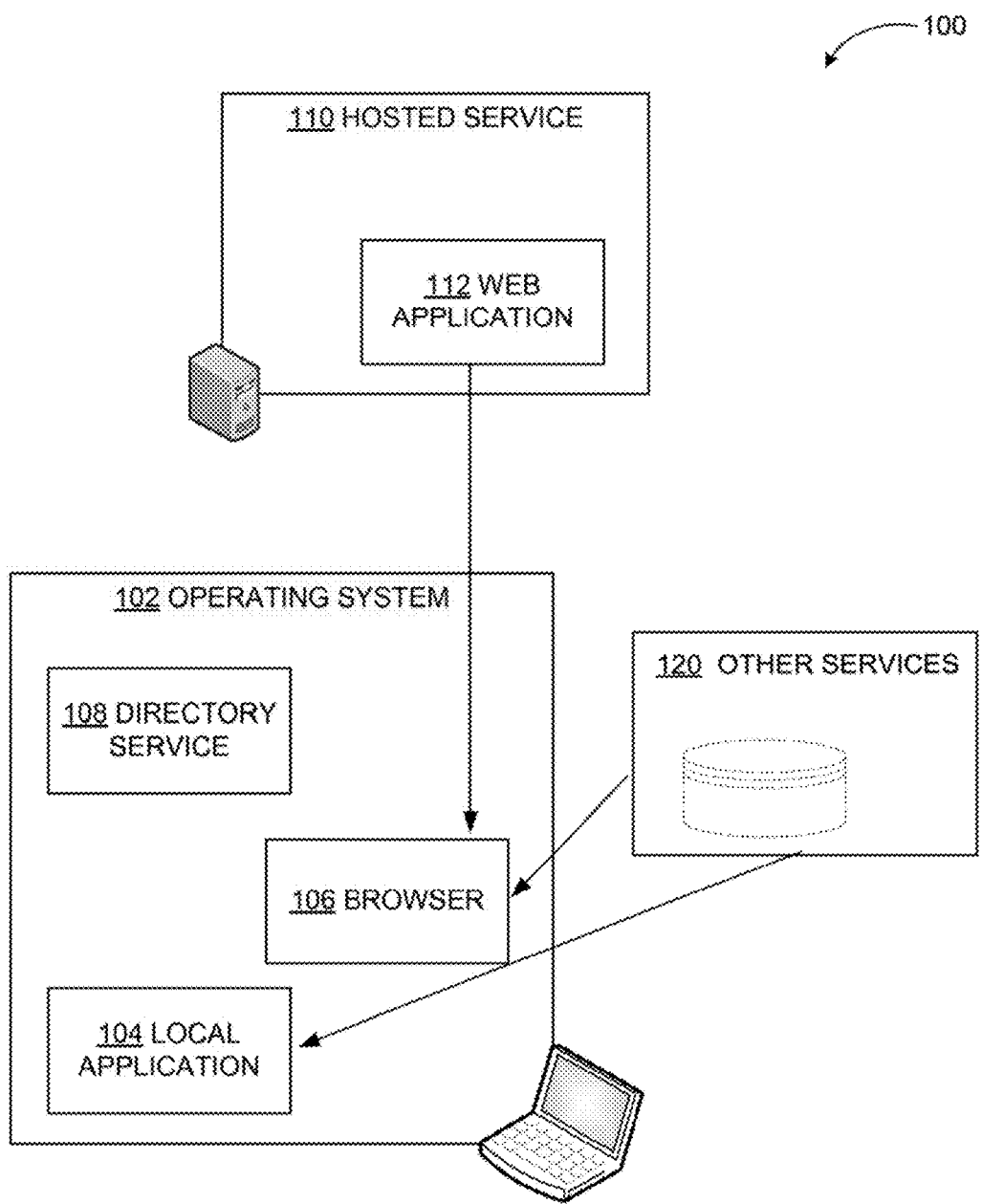
FIG. 1 includes example environments of applications that may be integrated with extensions.

As briefly described above, a mechanism may be provided for developers to bundle together a set of extensions (or add-ins) to a suite of applications and modules allowing end users and system administrators to manage their lifecycle in a unified way. Aspects such as discovery, acquisition, authorization, deployment, management, updates, and similar ones may be addressed for the bundle as opposed to each of the different extensions (for example extensions for different versions of the same application such as desktop version, web application version, mobile version, etc.). Bundles may also provide a means to match specific functional sets or commercial offerings to specific user or customer profiles.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or program/amble consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide bundling of extensions or add-ins in various environments. Examples of platforms include, but are not limited to, a hosted service executed over a plurality a servers, an application executed on a single computing device, and comparable systems. The term "server" generally refers to a computing device executing one or more software programs typically in a networked environment.

The terms "add-in", "extension", and "extension module" are used interchangeably herein and refer to the same entity. A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 includes example environments of applications that may be integrated with extensions.

Applications may be configured for various environments. Thus, extensions may have to be set up for the different environments or versions of the applications. For example, applications may have desktop (locally installed) versions, web versions, or mobile versions. Furthermore, an application may be part of a suite of applications with some functionality being managed at layers under the suite umbrella. Applications may also be part of a collaborative service, which may impose limitations or additional requirements on application functionality and/or extensibility. Some applications may require extensions to be xml-based, package-based, or managed by a directory service. Depending on application and extension type, the extensions may have a user interface that integrates into the application user interface, they may have their own user interface, or have no user interface.

Diagram 100 shows two example configurations. A hosted service 110 may provide web application 112, which a user may access through a browser 106 on their computing device. The browser 106 may be associated with other services 120. Any extensions that the user wishes to use may be integrated through the web application 112 in this configuration. Another example configuration is local application 104, which may be installed on the computing device and provide similar functionality to the web application 112. The local application 104 may integrate extensions directly or through the directory service 108, which may coordinate registration and other services for all applications within operating system 102.

With different types/versions of applications, extensions may be associated with different lifecycles, lifecycle mechanisms, and acquisition methods. Furthermore, authentication methods may be different for each type. Getting started experiences may vary for each application/extension type. Moreover, different terminology may be used for similar concepts and different tooling or debugging experiences may be provided. Thus, creating and installing extensions for similar applications within a suite or even same application in different platforms may involve deploying, acquiring, managing several different, disparate items.

A unified application model according to some embodiments may lower friction for developers, administrators, and users to customize applications and suites of applications. With a simpler development experience, developers may create extensions more easily and have more flexibility in how they scale their applications. Custom features may be submitted to an application/extension module store as one chunk rather than in multiple pieces. An entire suite of add-ins may be updated as one change and dependencies may be easier to track and manage.

Figure 2:
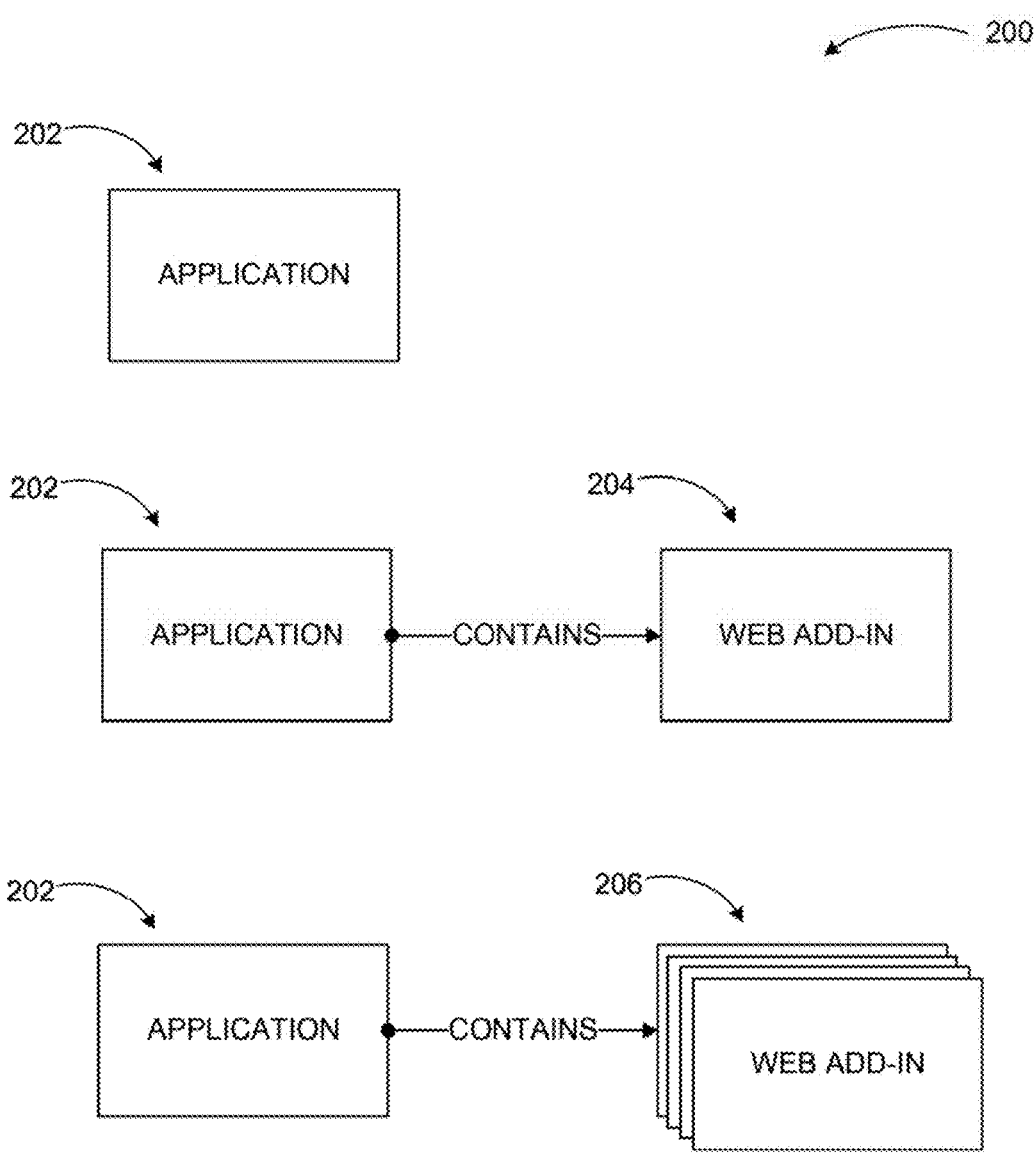
FIG. 2 illustrates a conceptual diagram showing an application and potential add-ins that may be used with it.

FIG. 2 illustrates a conceptual diagram showing an application and potential add-ins that may be used with it.

In providing a mechanism for developers to bundle together a set of extensions (or add-ins) to an application (for its different versions) or a suite, a simple lifecycle and permissions model may be used driven by a centralized platform for consumer and organization scenarios. A single listing in an extension/app store (or catalog) may extend to multiple host applications. The simplified model may provide fewer, clearer, and easily digestible concepts for users to understand. Extension creation process may also be simplified through developer portals that make hand-authoring extension manifests and metadata optional.

As shown in diagram 200, an application 202 such as a productivity application does not need to have extensions, but its functionality and user experience may be enhanced through extensions that may enable complementary functionality, which sometime may allow cohesion between different application types. If it is part of a suite, application 202 may use the suite's application programming interfaces (APIs), single sign-on (SSO) features, etc. Thus, application 202 may contain zero, one (web add-in 204), or multiple extensions (web add-ins 206). Aspects of the extensions such as discovery, acquisition, authorization, deployment, management, updates, and similar ones may be addressed for the bundle as opposed to each of the different extensions. While productivity applications and suites are discussed herein as example environments for various embodiments, embodiments are not limited to those environments and may be implemented in other applications or suites.

Figure 3:
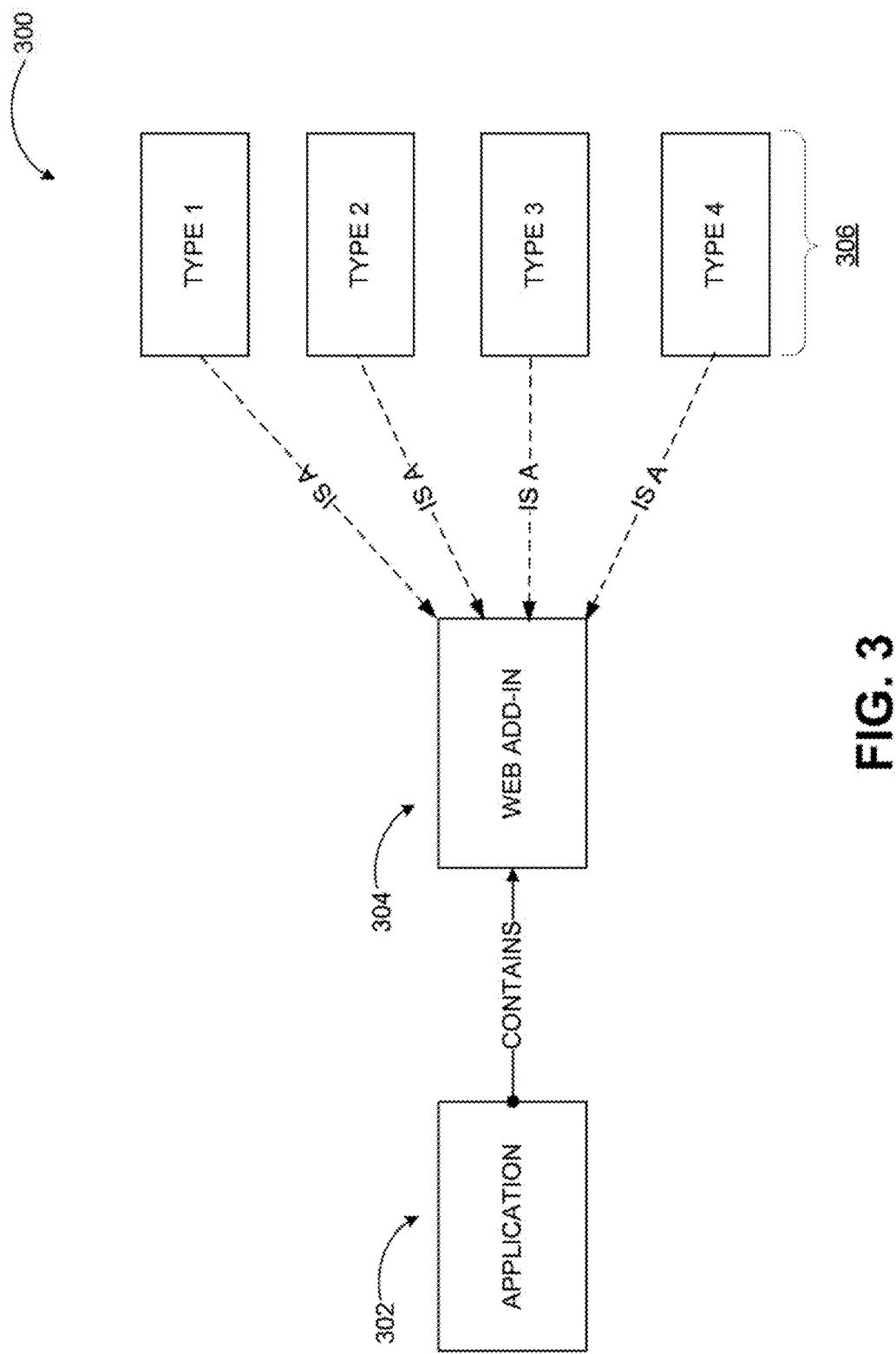
FIG. 3 illustrates definition of add-ins (extensions) through types.

FIG. 3 illustrates definition of add-ins (extensions) through types.

Diagram 300 shows an application 302 that contains an extension (web add-in 304), which may be of a particular type 306. The type of the extension indicates what the extension does. For example, extensions may be used to provide file conversion (converting a document to an image file), document approval (signature recording), security (virus, spam protection), extending functionality of an application into another application (spreadsheet functionality in a word processing application, cloud storage services, analysis services, sharing services, and many more.

Thus, an extension may enable a user to take advantage of a third party service or application within the application 302 without having to fully activate the third party service or application (and swap user interfaces, documents, data, etc.). For seamless operation of an extension within an application, extensions may have defined properties (e.g., icons, descriptions, etc.), activation parameters (e.g., locations of files, security tokens, etc.), and lifecycle events (e.g., what happens on install or uninstall). In a system according to embodiments that enables bundling of extensions, different aspects of the extensions that may have to be customized for different versions of the host application (e.g., icons to be displayed may have to be different between a desktop application and a mobile application considering display requirements) may be defined at once. The bundling may, thus, prevent a user or a developer having to consider each extension as an independent entity and process accordingly. For example, the developer may simply define the parameters for different application versions in the same package, and the user may simply select (or it may be automatically determined) the host application version and deal with a single package at install time.

Figure 4:
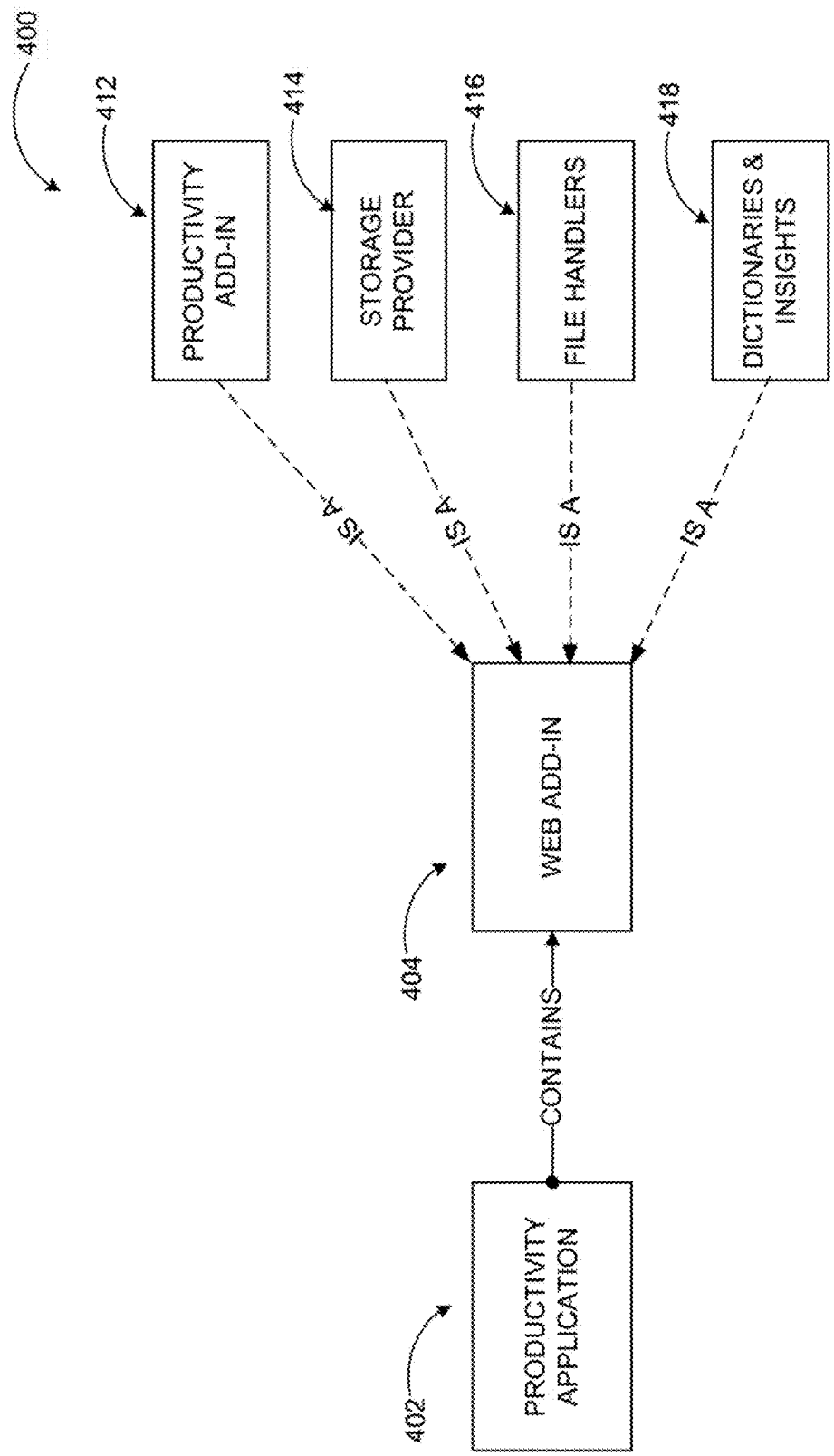
FIG. 4 illustrates four example types of add-ins.

FIG. 4 illustrates four example types of add-ins.

As shown in diagram 400, an extension 404 to be integrated into application 402 may be a productivity add-in 412, storage provider add-in 414, file handler 416, or dictionary/insight add-in 418. Some extensions may include one or more of these example functionalities in one embodiment. For example, an extension may provide access to cloud storage while also enabling handling of non-native files. Other extensions may provide multiple productivity functionalities through one extension. Yet other extensions may provide functionality associated with one version of an application (desktop version, for example) to another version of the same application (online version, for example).

Productivity add-in 412, storage provider add-in 414, and dictionary/insight add-in 418 are considered extensions that extend a client application (add on to the functionality of the host application). The added-on functionality may be a direct extension of the host application's native functionality, functionality of a similar application brought into the host application, or independent and complementary functionality.

Figure 5:
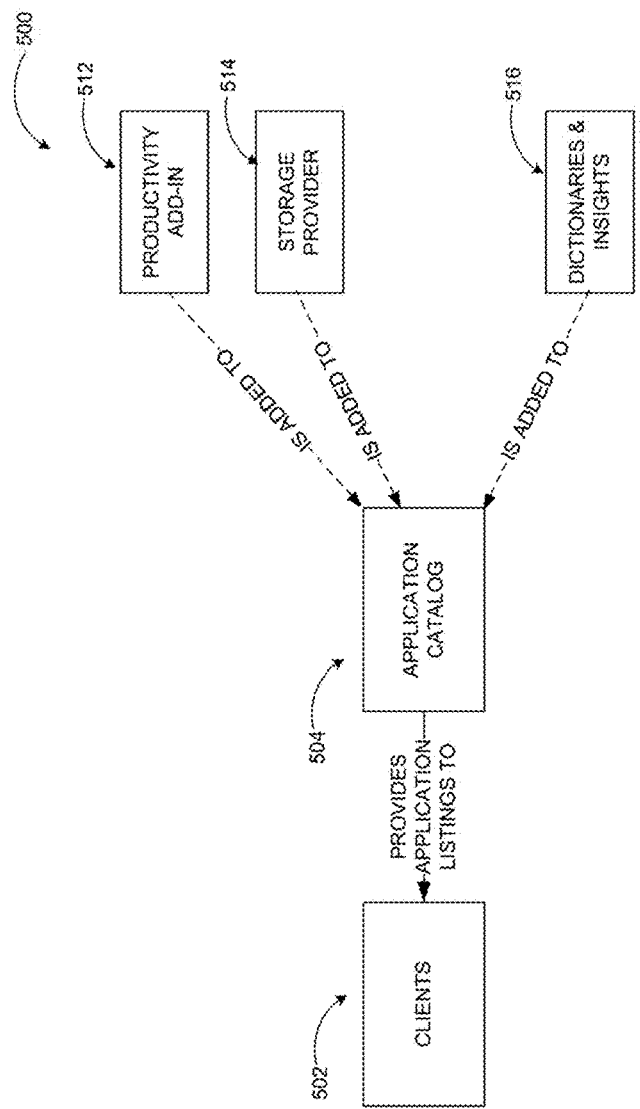
FIG. 5 illustrates how add-ins may be distributed.

FIG. 5 illustrates how add-ins may be distributed.

In some embodiments, extensions (e.g., productivity add-in 512, storage provider add-in 514, and dictionary/insight add-in 518) that extend client applications 502 may be individually deployed to their targets via catalogs 504 as shown in diagram 500. These individual add-ins may be registered in a directory service in order to access data within the client application at runtime, even if they are not part of a productivity application.

Figure 6:
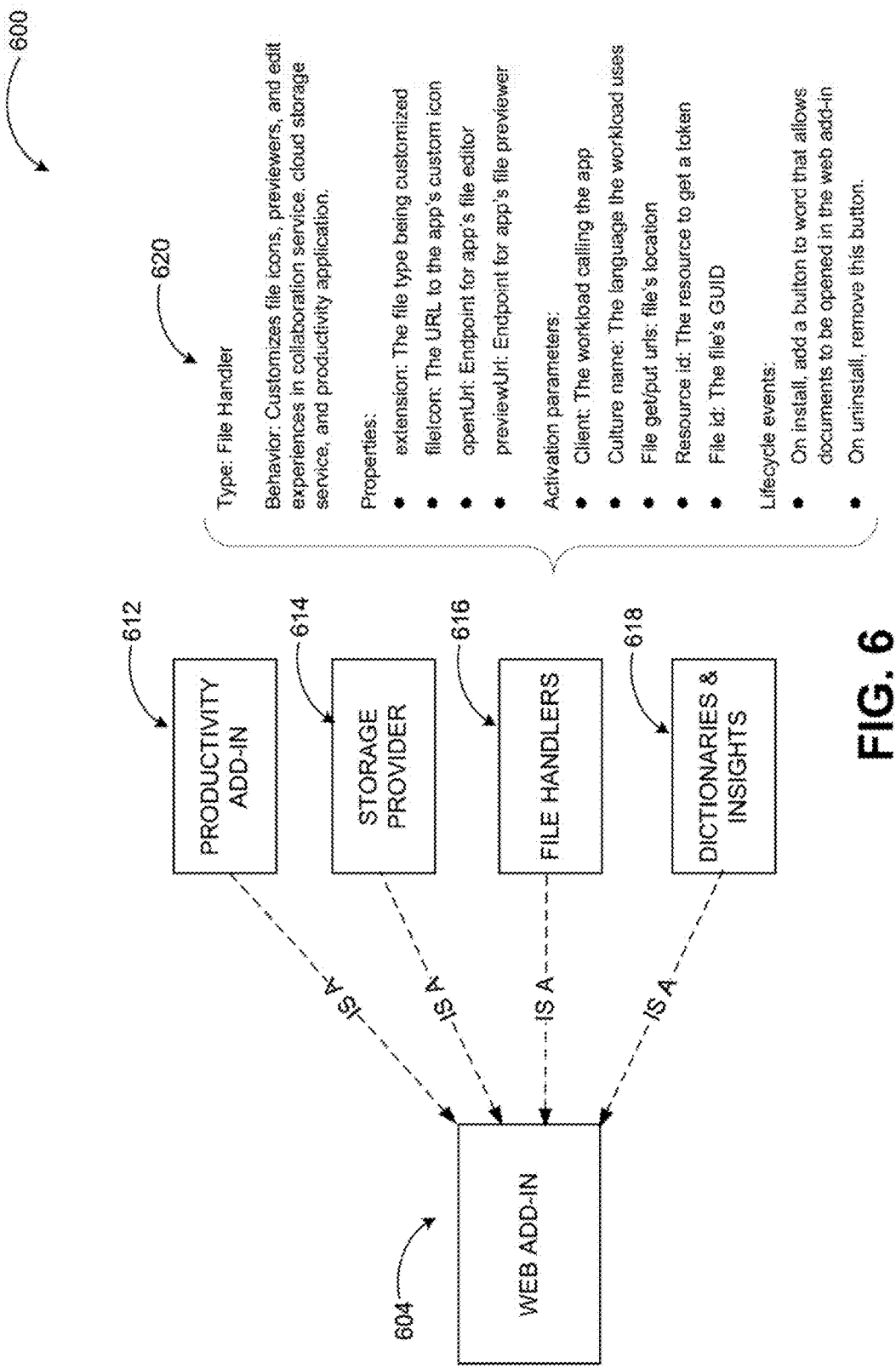
FIG. 6 illustrates an example type, file handler and its aspects.

FIG. 6 illustrates an example type, file handler, and its aspects.

Diagram 600 shows example details 620 of an extension's five major components: type, behavior, property, activation parameters, and lifecycle events. An extension's type provides its definition. In the example of diagram 600, the extension 604 may be a productivity add-in 612, a storage provider add-in 614, a file handler 616, or a dictionary and insight add-in 618. The example type selected for extension 604 is file handler.

The extension's behavior may describe how and where the extension changes the host application (or suite). In the file handler example, the extension customizes file icons, previewers, and edit experience in online services and applications. The extension's properties may include information that the extension needs to function. The activation parameters may be passed to the extension at runtime to give it context and may include a definition of the application that is calling the extension, a language used by the application, file location(s), security information (where to receive a directory service token, for example), and so on.

The extension's lifecycle events may enable the extension to add further customizations at install or uninstall among others, for example, adding a button to the application's user interface that allows documents to be opened in the extension and removing the button upon uninstall.

In some embodiments, a user interface to declare extensible components may be provided alongside other extension and permission metadata. Existing extension metadata may be viewed and edited through the same user interface. Developers may be enabled to define new extensions from the same user interface as well. In other embodiments, a wizard may allow developers to view and select extensibility options such as which extension can be added to which applications, specify properties/behaviors/lifecycle events.

The examples in FIGS. 1 through 6 have been described using specific functionalities, extension types, environments, systems, services, applications and processes to provide bundling of extensions. Embodiments are not limited to the specific network environments, systems, services, applications, and processes according to these examples.

Bundling together a set of extensions (or add-ins) to a productivity suite may allow end users and system administrators to manage their lifecycle in a unified way and thus improve user efficiency. For example, enabling aspects such as discovery, acquisition, authorization, deployment, management, updates, and similar ones to be addressed for the bundle as opposed to each of the different extensions may enable increased user interaction performance. Moreover, downloading and configuration of various extensions for different application versions or different applications within a suite may be avoided, thus reducing memory usage.

Embodiments address a need that arises from very large scale of operations created by networked computing and cloud based services that cannot be managed by humans. The actions/operations described herein are not a mere use of a computer, but address results of a system that is a direct consequence of software used as a service such as productivity suites offered in conjunction with large numbers of extensions.

Figure 7:
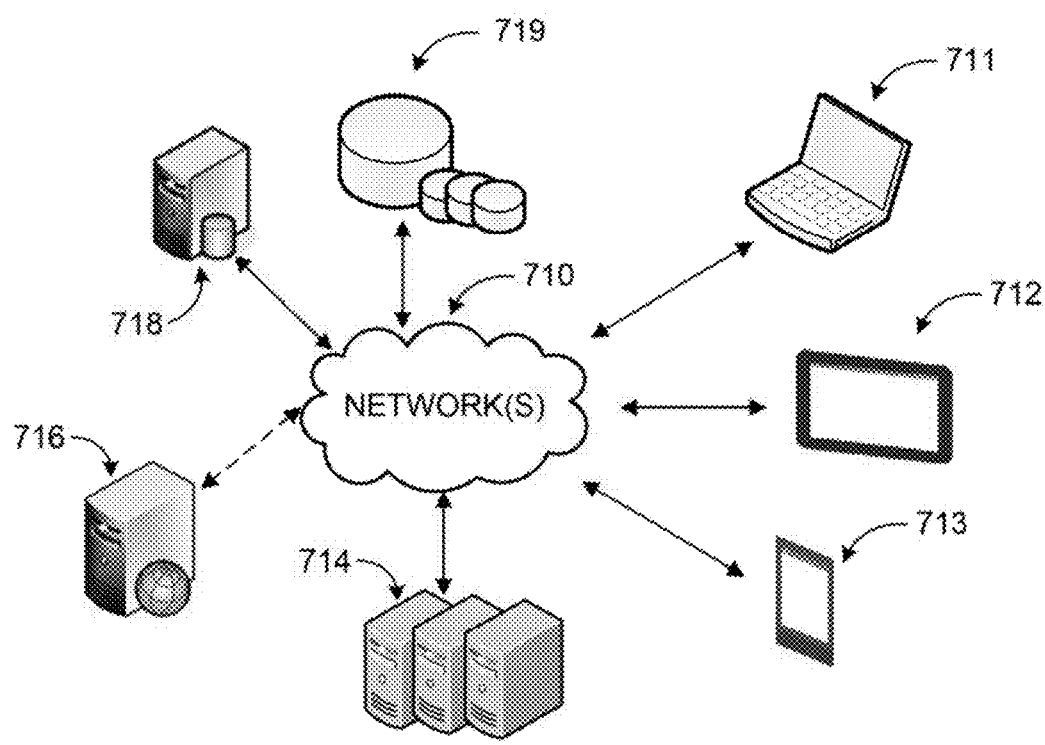
FIG. 7 is a simplified networked environment, where a system according to embodiments may be implemented.

FIG. 7 is an example networked environment, where embodiments may be implemented. Bundling together a set of extensions (or add-ins) to a productivity suite may be implemented via software executed over one or more servers 714 such as a hosted service. The platform may communicate with client applications on individual computing devices such as a smart phone 713, a mobile computer 712, or desktop computer 711 ('client devices') through network(s) 710.

Client applications executed on any of the client devices 711-713 may facilitate communications via application(s) executed by servers 714, or on individual server 716. Aspects such as discovery, acquisition, authorization, deployment, management, updates, and similar ones may be addressed for the bundle as opposed to each of the different extensions (for example extensions for different versions of the same application such as desktop version, web application version, mobile version, etc.). Bundles may also provide a means to match specific functional sets or commercial offerings to specific user or customer profiles. The platform may store data associated with extensions and bundling of extensions in data store(s) 719 directly or through database server 718.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also coordinate communication over other networks such as Public Switched Telephone Network (PSTN) or cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Many other configurations of computing devices, applications, data sources, and data distribution systems may be employed to provide bundling for extensions. Furthermore, the networked environments discussed in FIG. 7 are for illustration purposes only. Embodiments are not limited to the example applications, modules, or processes.

Figure 8:
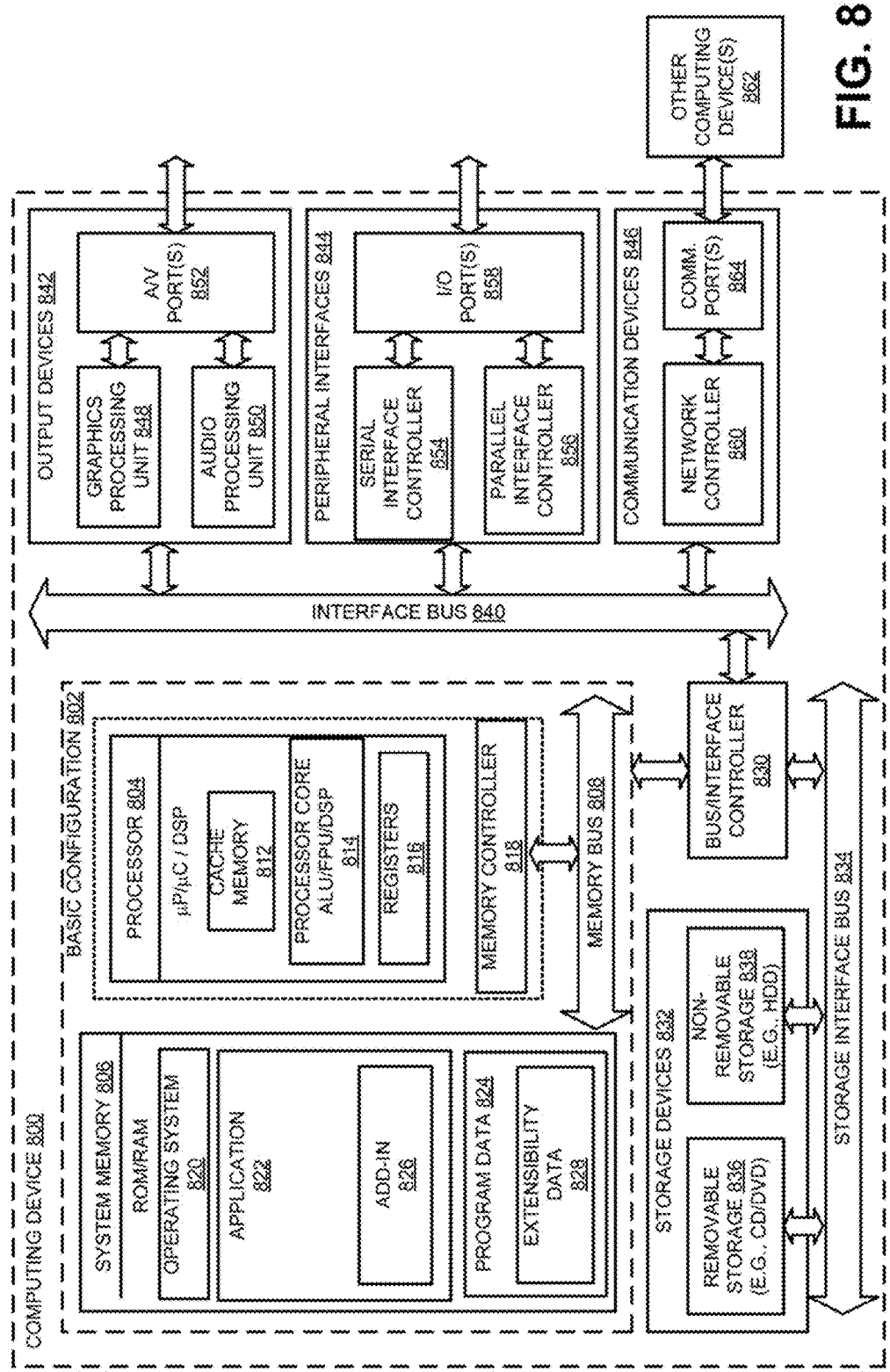
FIG. 8 is a block diagram at an example computing device, which may be used to implement bundling of extensions.

FIG. 8 and the associated discussion are intended to provide a brief, general description of a general purpose computing device, which may be used to implement bundling of extensions.

For example, computing device 800 may be used as a server, desktop computer, portable computer, smart phone, special purpose computer, or similar device. In an example basic configuration 802, the computing device 800 may include one or more processors 804 and a system memory 806. A memory bus 808 may be used for communicating between the processor 804 and the system memory 806. The basic configuration 802 is illustrated in FIG. 8 by those components within the inner dashed line.

Depending on the desired configuration, the processor 804 may be of any type, including but not limited to a microprocessor (µP), a microcontroller (µC), a digital signal processor (DSP), or any combination thereof. The processor 804 may include one more levels of caching, such as a level cache memory 812, one or more processor cores 814, and registers 816. The example processor cores 814 may (each) include an arithmetic logic unit (ALU), a floating point unit (FPU), a digital signal processing core (DSP Core), or any combination thereof. An example memory controller 818 may also be used with the processor 804, or in some implementations the memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, an application 822, and program data 824. The application 822 may include one or more extensions such as add-in 826 to provide additional functionality within the application. The add-in 826 may be provided by its developer as part of a bundle and defined through a type, a behavior, a property, an activation parameter, and/or a lifecycle event. The add-in 826 may be integrated into the application 822 and to other versions of the application 822 based on the definition, where the versions may include a web application, a desktop application, or a mobile application. The program data 824 may include, among other data, extensibility data 828 that may be used to define and customize aspects of the add-in 826, as described herein.

The computing device 800 may have additional features or functionality, and additional interfaces to facilitate communications between the basic configuration 802 and any desired devices and interfaces. For example, a bus/interface controller 830 may be used to facilitate communications between the basic configuration 802 and one more data storage devices 832 via a storage interface bus 834. The data storage devices 832 may be one or more removable storage devices 836, one or more non-removable storage devices 838, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (for example, one or more output devices 842, one or more peripheral interfaces 844, and one or more communication devices 846) to the basic configuration 802 via the bus/interface controller 830. Some of the example output devices 842 include a graphics processing unit 848 and an audio processing unit 850, which may be configured to communicate to various external devices such as a display or speakers via one or more A/V ports 852. One or more example peripheral interfaces 844 may include a serial interface controller 854 or a parallel interface controller 856, which may be configured to communicate with external devices such as input devices (for example, keyboard, mouse, pen, voice input device, touch input device, etc.) or other peripheral devices (for example, printer, scanner, etc.) via one or more I/O ports 858. An example communication device 846 includes a network controller 860, which may be arranged to facilitate communications with one or more other computing devices 862 over a network communication link via one or more communication ports 864. The one or more other computing devices 862 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may also be implemented as a part of a general purpose or specialized server, mainframe, or similar computer that includes any of the above functions. The computing device 800 may also be implemented as a personal computer including both laptop computer and non-laptop computer configurations.

Example embodiments may also include methods to provide bundling of extensions. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 9:
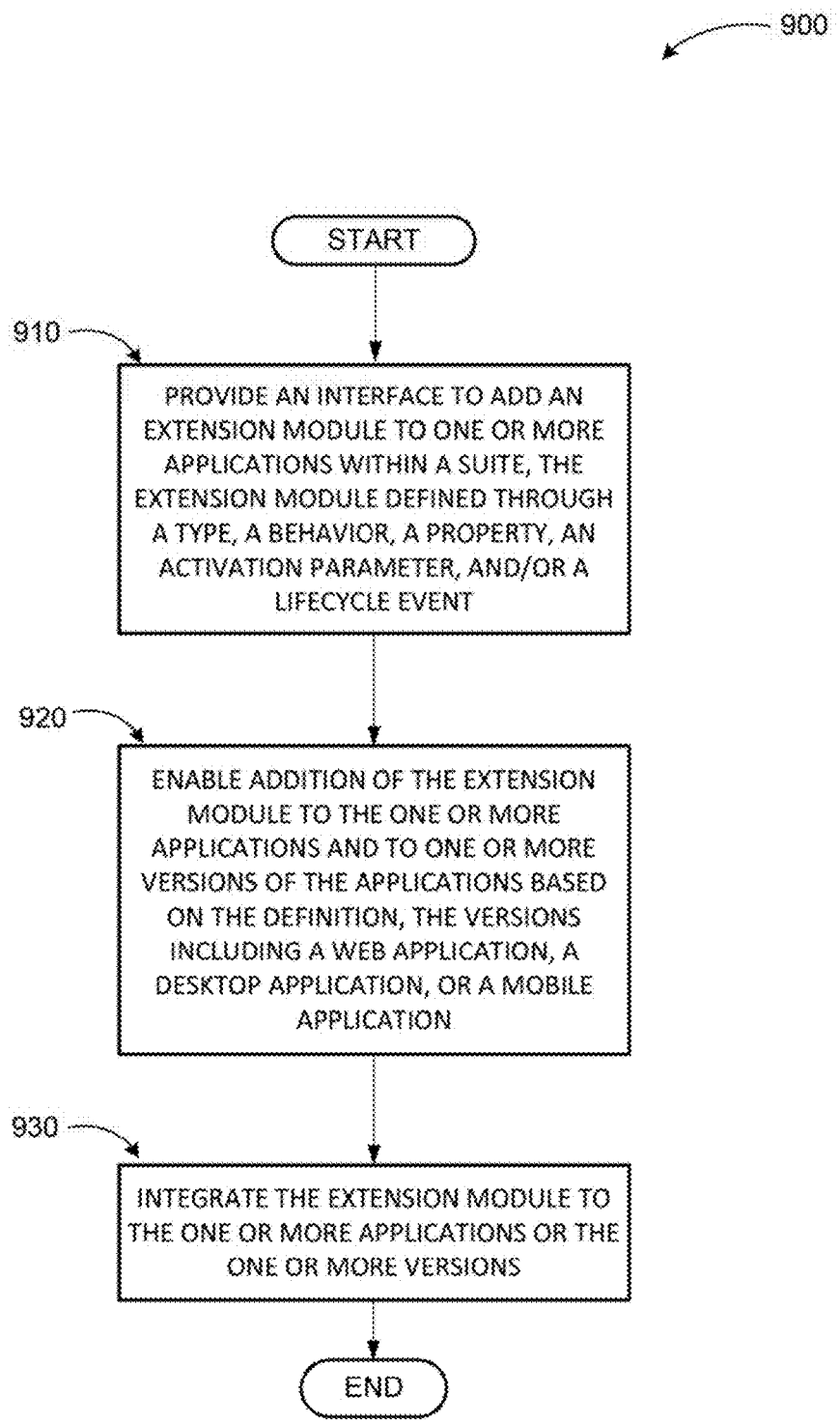
FIG. 9 illustrates a logic flow diagram of a method to provide bundling of extensions according to embodiments.

FIG. 9 illustrates a logic flow diagram of a method to provide bundling of extensions, according to embodiments. Process 900 may be implemented on a computing device such as the computing device 800 or other system.

Process 900 begins with operation 910, where an interface such as an application programming interface (API) may be provided to add an extension module to one or more applications, for example, within a productivity suite. The extension module may be defined through a type, a behavior, a property, an activation parameter, and/or as lifecycle event.

At operation 920, addition of the extension module to the one or more applications and to one or more versions of the one or more applications may be enabled based on the definition. The versions may include a web application, as desktop application, or a mobile application. At operation 930, the extension module may be integrated to the one or more applications or the one or more versions.

The operations included in process 900 are for illustration purposes. Providing bundling of extensions may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a computing device configured to provide extensibility bundles for applications and application suites is described. The computing device may include a memory configured to store one or more instructions associated with execution of a suite of applications and a processor coupled to the memory and configured to execute the suite of applications. The suite of applications may include a management module configured to provide an interface to add an extension module to one or more applications within the suite of applications, where the extension module is defined through at least one of a type, a behavior, a property, an activation parameter, and a lifecycle event. The management module may also be configured to enable addition of the extension module to the one or more applications and to one or more versions of the one or more applications based on the definition. The suite of applications may also include an integration module configured to integrate the extension module to the one or more applications or the one or more versions.

According to other examples, the versions of the one or more applications may include one or more of a web application, a desktop application, and a mobile application. The management module may be further configured to identify the extension module based on the type definition. The type definition may include one or more of a productivity extension module, a storage provider extension module, a file handler extension module, and a dictionary and insight extension module. The management module may also be configured to identify a functionality of the extension module based on the behavior definition, identify information for the extension module to function based on the property definition, and pass the activation parameter to the extension module at runtime to provide the extension module a context.

According to further examples, the integration module may be configured to identify customization events at install and uninstall times for the extension module based on the lifecycle event definition. The management module may be further configured to enable a user to configure an extensibility package based on an application version or an application type to select and install a suitable extension module. The management module may also be configured to receive extensibility packages for available extension modules from an extensibility catalog associated with the suite of applications.

According to other examples, a method to provide extensibility bundles for applications and application suites is described. The method may include providing an interface to add an extension module to one or more applications within a suite of applications, where the extension module is defined through at least one of a type, a behavior, a property, an activation parameter, and a lifecycle event. The method may also include enabling addition of the extension module to the one or more applications and to one or more versions of the one or more applications based on the definition, where the versions of the one or more applications include one or more of a web application, a desktop application, and a mobile application. The method may also include integrating the extension module to the one of more applications or the one or more versions.

According to some examples, the method may include providing an interface to enable a developer define an extensibility package of extension modules suitable for applications within the suite of applications or the one or more versions of the application without having to consider each extension module as an independent entity. Providing the interface to enable the developer define the extensibility package may include providing a user interface to declare extension modules alongside presented extension nodule and permission metadata.

According to yet other examples, the method may include enabling the developer to view and edit existing extension module metadata through the same user interface and defining new extension modules through the same user interface. The method may also include providing a wizard to enable the developer to view and select extensibility options associated with selection of extension module for related applications, specification of extension module properties, specification of extension module behaviors, and specification of extension module lifecycle events. The method may further include enabling management of one or more aspects of a plurality of extension modules within an extensibility package to be addressed for the extensibility package as opposed to each of the plurality of extension modules, where the one or more aspects include a discovery, an acquisition, an authorization, a deployment, and an update.

According to further examples, a computer-readable memory device with instructions stored thereon to provide extensibility bundles for a productivity suite is described. The instructions may include providing an interface to add an extension module to one or more applications within the productivity suite, where the extension module is defined through at least one of a type, a behavior, as property, an activation parameter, and as lifecycle event; enabling addition of the extension module to the one or more applications and to one or more versions of the one or more applications based on the definition, where the versions of the one or more applications include one or more of a web application, a desktop application, and to mobile application, and integrating the extension module to selected ones of the one or more applications or the one or more versions.

According to yet further examples, the extension module may be identified based on the type definition, a functionality of the extension module may be identified based on the behavior definition, information for the extension module to function may be identified based on the property definition, and the activation parameter may be passed to the extension module at runtime to provide the extension module a context. The productivity suite may include one or more of a word processing application, a spreadsheet application, a presentation application, a communication application, and a collaboration application. The instructions may further include providing extensibility packages for available extension modules through an extensibility catalog associated with the productivity suite and enabling one or both of an administrator and a user to configure the extensibility package based on an application version or an application type to select and install as suitable extension module.

According to some examples, a means for providing extensibility bundles for applications and application suites is described. The means for providing extensibility bundles for applications and application suites may include a means for providing an interface to add an extension module to one or more applications within a suite of applications, where the extension module is defined through at least one of a type, a behavior, a property, an activation parameter, and a lifecycle event. The means for providing extensibility bundles for applications and application suites may also include a means for enabling addition of the extension module to the one or more applications and to one or more versions of the one or more applications based on the definition, where the versions of the one or more applications include one or more of a web application, a desktop application, and a mobile application. The means for providing extensibility bundles for applications and application suites may also include a means for integrating the extension module to the one or more applications or the one or more versions.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device configured to provide extensibility bundles for applications and application suites, the computing device comprising:
a memory configured to store one or more instructions associated with execution of a suite of applications; and
one or more processors coupled to the memory and configured to execute the suite of applications, wherein the suite of applications includes:
a management module that:
provides an interface to add an extension module to one or more applications within the suite of applications, wherein the extension module is defined through a type, an activation parameter, and at least one of a behavior, a property, and a lifecycle event;
passes the activation parameter to the extension module at runtime to provide the extension module a context, wherein the activation parameter includes at least one of a definition of an application that is calling an extension and security information of where to receive a directory service token; and
enables addition of the extension module to the one or more applications and to one or more versions of the one or more applications based on one or more definitions of the extension module; and
an integration module that integrates the extension module to the one or more applications or the one or more versions.

2. The computing device of claim 1, wherein the versions of the one or more applications include one or more of a web application, a desktop application, and a mobile application.

3. The computing device of claim 1, wherein the management module is configured to identify the extension module based on the type definition.

4. The computing device of claim 3, wherein the type definition includes one or more of a productivity extension module, a storage provider extension module, a file handler extension module, metadata, a chart module, and a dictionary and insight extension module.

5. The computing device of claim 1, wherein the management module is configured to identify a functionality of the extension module based on the behavior definition.

6. The computing device of claim 1, wherein the management module is configured to identify information for the extension module to function based on the property definition.

7. The computing device of claim 1, wherein the integration module is configured to identify customization events at install and uninstall tines for the extension module based on the lifecycle event definition.

8. The computing device of claim 1, wherein the management module is further configured to enable a user to configure an extensibility package based on an application version or an application type to select and install a suitable extension module.

9. The computing device of claim 1, wherein the management module is further configured to receive extensibility packages for available extension modules from an extensibility catalog associated with the suite of applications.

10. A method to provide extensibility bundles for applications and application suites, the method comprising:
provided an interface to add an extension module to one or more applications within a suite of applications, wherein the extension module is defined through a type, an activation parameter, and at least one of a behavior, a property, and a lifecycle event;
passing the activation parameter to the extension module at runtime to provide the extension module a context, wherein the activation parameter includes at least one of a definition of an application that is calling an extension and security information of where to receive a directory service token;
enabling addition of the extension module to the one or more applications and to one or more versions of the one or more applications based on one or more definitions of the extension module, wherein the versions of the one or more applications include one or more of a web application, a desktop application, and a mobile application; and
integrating the extension module to the one or more applications or the one or more versions.

11. The method of claim 10, further comprising:
providing an interface to enable a developer define an extensibility package of extension modules suitable for applications within the suite of applications or the one or more versions of the application without having to consider each extension module as an independent entity.

12. The method of claim 11, wherein providing the interface to enable the developer define the extensibility package comprises:
providing a user interface to declare extension modules alongside presented extension module and permission metadata.

13. The method of claim 12, further comprising:
enabling the developer to view and edit existing extension module metadata through the same user interface; and
defining new extension modules through the same user interface.

14. The method of claim 12, further comprising:
providing a wizard to enable the developer to view and select extensibility options associated with selection of extension module for related applications, specification of extension module properties, specification of extension module behaviors, and specification of extension module lifecycle events.

15. The method of claim 10, further comprising:
enabling management of one or more aspects of a plurality of extension modules within an extensibility package to be addressed for the extensibility package as opposed to each of the plurality of extension modules, wherein the one or more aspects include a discovery, an acquisition, an authorization, a deployment, an update, a de-acquisition (removal), a de-authorization, and a re-authorization.

16. A method to provide extensibility bundles for a productivity suite, the method comprising:
providing an interface to add an extension module to one or more applications within the productivity suite, wherein the extension module is defined through a type, an activation parameter, and at least one of a behavior, a property, and a lifecycle event;
passing the activation parameter to the extension module at runtime to provide the extension module a context, wherein the activation parameter includes at least one of a definition of an application that is calling an extension and security information of where to receive a directory service token;
enabling addition of the extension module to the one or more applications and to one or more versions of the one or more applications based on one or more definitions of the extension module, wherein the versions of the one or more applications include one or more of a web application, a desktop application, and a mobile application; and
integrating the extension module to selected ones of the one or more applications or the one or more versions.

17. The method of claim 16, wherein the extension module is identified based on the type definition, a functionality of the extension module is identified based on the behavior definition, information for the extension module to function is identified based on the property definition, and the activation parameter is passed to the extension module at runtime to provide the extension module a context.

18. The method of claim 17, wherein the productivity suite includes one or more of a word processing application, a spreadsheet application, a presentation application, a communication application, and a collaboration application.

19. The method of claim 16, wherein the instructions further comprise:
providing extensibility packages for available extension modules through an extensibility catalog associated with the productivity suite; and
enabling one or both of an administrator and a user to configure the extensibility package based on an application version or an application type to select and install a suitable extension module.

* * * * *